United States Patent
Ziolkowski

(10) Patent No.: US 8,143,897 B2
(45) Date of Patent: Mar. 27, 2012

(54) SHORT-OFFSET TRANSIENT ELECTROMAGNETIC GEOPHYSICAL SURVEYING

(75) Inventor: Antoni Marjan Ziolkowski, Edinburgh (GB)

(73) Assignee: MTEM Ltd., Edinburgh (GB)

( * ) Notice: Subject to any disclaimer, the term of this patent is extended or adjusted under 35 U.S.C. 154(b) by 344 days.

(21) Appl. No.: 12/378,104

(22) Filed: Feb. 11, 2009

(65) Prior Publication Data

US 2010/0201367 A1    Aug. 12, 2010

(51) Int. Cl.
G01V 3/15    (2006.01)
G01V 3/17    (2006.01)
G01V 3/08    (2006.01)

(52) U.S. Cl. ........ 324/365; 324/334; 324/335; 324/337; 702/7; 367/23; 367/142; 367/178

(58) Field of Classification Search .................. 324/365, 324/334–357; 702/2–7; 367/131, 141, 21–23, 367/142–143

See application file for complete search history.

(56) References Cited

U.S. PATENT DOCUMENTS

| | | | |
|---|---|---|---|
| 6,914,433 | B2 | 7/2005 | Wright et al. |
| 7,446,535 | B1 | 11/2008 | Tenghamn |
| 7,671,598 | B2 * | 3/2010 | Ronaess et al. ............ 324/365 |
| 7,795,873 | B2 * | 9/2010 | Ziolkowski et al. ......... 324/365 |
| 7,812,611 | B2 * | 10/2010 | Johnstad et al. ............ 324/365 |
| 7,834,632 | B2 * | 11/2010 | Tenghamn et al. .......... 324/365 |
| 8,063,642 | B2 * | 11/2011 | Ziolkowski .................. 324/365 |
| 2004/0027130 | A1 * | 2/2004 | Ellingsrud et al. .......... 324/334 |
| 2004/0232917 | A1 * | 11/2004 | Wright et al. ............... 324/336 |
| 2005/0237063 | A1 | 10/2005 | Wright |
| 2009/0132166 | A1 * | 5/2009 | Alumbaugh et al. ........... 702/2 |
| 2009/0216454 | A1 | 8/2009 | Ziolkowski |
| 2009/0230970 | A1 | 9/2009 | Ziolkowski |
| 2009/0265111 | A1 * | 10/2009 | Helwig et al. ................. 702/7 |
| 2009/0309599 | A1 | 12/2009 | Ziolkowski |
| 2010/0013486 | A1 | 1/2010 | Ziolkowski |
| 2010/0017133 | A1 | 1/2010 | Ziolkowski |
| 2010/0017156 | A1 | 1/2010 | Ziolkowski |
| 2010/0057366 | A1 | 3/2010 | Wright |
| 2010/0090701 | A1 | 4/2010 | Ziolkowski |
| 2010/0109671 | A1 * | 5/2010 | Hobbs ........................ 324/334 |
| 2010/0134110 | A1 | 6/2010 | Ziolkowski |
| 2010/0188090 | A1 * | 7/2010 | Ziolkowski .................. 324/335 |
| 2010/0231224 | A1 * | 9/2010 | Lindqvist .................... 324/365 |

FOREIGN PATENT DOCUMENTS

| | | |
|---|---|---|
| WO | WO 03/023452 | 3/2003 |
| WO | 2006114561 A2 | 11/2006 |
| WO | 2007017657 A1 | 2/2007 |
| WO | WO 2007/104949 | 9/2007 |
| WO | 2008023194 A2 | 2/2008 |

(Continued)

OTHER PUBLICATIONS

A. Ziolkowski, B.A. Hobbs, D. Wright, (2007), "Multitransient electromagnetic demonstration survey in France", Geophysics, vol. 72, No. 4, pp. F197-F209.

(Continued)

*Primary Examiner* — Huy Q Phan
*Assistant Examiner* — Emily Chan

(57) ABSTRACT

A method for electromagnetic surveying subsurface formations includes inducing an electromagnetic field in the subsurface formations by passing electric current through a transmitter. Response of the subsurface formations to the induced electromagnetic field is detected at a first plurality of spaced apart positions disposed longitudinally within a bipole length of the transmitter. A direct induction response is removed from the detected response.

9 Claims, 3 Drawing Sheets

FOREIGN PATENT DOCUMENTS

WO       2008099151 A2    2/2008
WO    WO 2008/023174      2/2008

OTHER PUBLICATIONS

A. Ziolkowski, D. Wright (2007), "Removal of air wave in shallow marine transient EM date", 77$^{th}$ Annual International Meeting, SEG Expanded Abstracts, vol. 26, pp. 534-538.

Dr. M. H. Loke, Electrical Imaging Surveys for Environmental and Engineering Studies, A Practical Guide to 2-D and 3-D Surveys, http://www.abem.se/files/res/2Dnotes.pdf, 2001.

European Search Report for Application EP 10 15 2880, dated Apr. 23, 2010.

* cited by examiner

SHORT-OFFSET TRANSIENT ELECTROMAGNETIC GEOPHYSICAL SURVEYING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic surveying of the Earth's subsurface. More particularly, the invention relates to techniques for deploying electromagnetic energy sources and electromagnetic receivers for more effective subsurface surveying.

2. Background Art

Porous subsurface sedimentary rock formations are typically saturated with fluids as a result of having been deposited in a body of water during sedimentation. As a result, the fluids were initially entirely water. In some subsurface formations the water in the pore spaces has been displaced to some extent after sedimentation by hydrocarbons such as oil and gas. Thus, in some present day subsurface formations, the fluids in their pore spaces may be water, gas or oil, or mixtures of the foregoing.

Detection of formations having less than fully water-saturated pore space, that is, when oil or gas is present in the pore spaces, is of significant economic interest. Certain techniques for detection of such formations include determining existence of electrical resistivities in the subsurface that are anomalously high. The principle of such detection is based on the fact that the flow of electric current through a porous rock formation is related to the fractional volume of the pore spaces with respect to the total rock volume, the spatial configuration of the pore spaces and the electrical properties of the fluids filling the pore spaces. Brine-saturated porous rock formations, for example, are typically much less resistive than the same rock formations having hydrocarbons in some or all of the pore spaces, because brine is a relatively good electrical conductor while hydrocarbons are typically good electrical insulators.

Various techniques for measuring the electrical resistivity of subsurface rock formations are known in the art, for example, time domain electromagnetic survey techniques such as described in International Patent Application Publication No. WO 03/023452. Such techniques in general include imparting an electromagnetic field into the subsurface formations and measuring electric and/or magnetic fields induced in the subsurface formation in response to the imparted electromagnetic field. For such measurement techniques, the electromagnetic field may be imparted using an electric field transmitter, for example, by passing an electric current through a bipole electrode pair. Alternatively, a magnetic field transmitter may be used, for example, passing an electric current through a wire loop or a plurality of such loops. The receivers used to detect the responsive electromagnetic fields may be bipole electrode pairs for measuring potential differences (electric field potential), or may be wire loops, pluralities of wire loops or magnetometers for measuring magnetic field amplitude and/or the time derivatives of magnetic field amplitude. The electric current used to impart the electromagnetic field may be controlled to provide a step change in the current amplitude. Step change in the transmitter current induces what are referred to as "transient" electromagnetic fields, and the responses measured by the receivers are related to transient response of the formations in the earth's subsurface. Step change in the transmitter current may be obtained by switching the current on, switching the current off, reversing polarity, or combinations of the foregoing. A particularly advantageous form of transmitter current switching configuration used to impart the electromagnetic field is a so called "pseudo-random binary sequence" (PRBS).

In surveying an area of the subsurface using electromagnetic techniques, it is desirable to obtain signals corresponding to various distances ("offsets") between the transmitter and receiver. In a typical survey implementation using PBRS transmitter current switching, a different bandwidth PRBS can be used for different ranges of offset. In one such example, for surveying formations below the bottom of a body of water, a receiver vessel may deploy a plurality of receivers in a selected pattern, such as a line array, on the water bottom. A separate transmitter vessel may deploy the transmitter on or at a nominal distance from the water bottom. The transmitter may be actuated and signals from the receivers recorded. Electromagnetic signals corresponding to various offsets may be obtained by moving the transmitter vessel, actuating the transmitter, and recording signals from the receivers, successively. The transmitter current is measured during actuation and the measurements thereof can then be transmitted to the receiver vessel for data quality control and processing. To survey different areas of the subsurface below the water bottom, the receiver vessel may withdraw the receivers from the water bottom, move to a different location, and once again deploy the receivers on the water bottom in a different location. The above-described transmitter deployment, transmitter actuation and signal recording may then be repeated.

Multi-transient electromagnetic (MTEM) data acquisition as described, for example in U.S. Pat. No. 6,914,433 B2 issued to Wright et al, typically uses a grounded electric transmitter and grounded electric bipole receivers, essentially as explained above with reference to marine surveying. The electrodes of the transmitter and the receivers are typically disposed in approximately the same vertical plane. The electromagnetic field induced by the transmitter may be spatially defined by the diffusion equation, and the induced field spreads out and diminishes in amplitude as it propagates through the subsurface. The measured impulse response of the Earth (e.g., the voltage impressed on any bipole receiver with respect to time) rises to a peak amplitude and then slowly decays to zero. It can be shown that the time to the response peak from any individual transient electromagnetic field event ($t_{peak}-t_0$) increases as the square of the offset r, while the amplitude of the response peak decreases as the fifth power of the offset ($1/r^5$). See, Ziolkowski, A., and D. Wright, *Removal of the air wave in shallow marine transient EM data*, 77th Annual International Meeting, SEG Expanded Abstracts, 26, 534-538 (2007) and Ziolkowski, A., Hobbs, B. A. and Wright, D., *Multitransient electromagnetic demonstration survey in France*, Geophysics, 72, 197-209 (2007).

An example acquisition system configuration for performing the method described in the Wright et al. '433 patent is shown in FIG. 1. A survey vessel 10 moves along the surface of a body of water 11 such as a lake or the ocean. The survey vessel 10 has thereon equipment shown generally at 12 and referred to for convenience as a "recording system." A receiver cable 16 may be deployed on the water bottom 20 (or may be towed in the water), and may include a plurality of spaced apart electric bipole receivers, each shown generally as pairs of electrodes C and D. Signals resulting from voltages impressed across the receivers C, D may be communicated to a recording node 18 or similar device associated with the receiver cable 16. The vessel 10 may tow a transmitter cable 14. The transmitter cable 14 may include an electromagnetic transmitter in the form of an electric bipole, shown as spaced apart electrodes A, B. The recording system 12 may include a power supply to pass electric current across the transmitter electrodes A, B. Surveying using the arrangement shown in FIG. 1 is typically performed when the transmitter electrodes A, B are positioned longitudinally beyond one end of the receiver cable 16, in what is known as an "end-on" arrangement. Surveying is performed by passing current through the transmitter electrodes A, B and detecting response of formations 22 below the water bottom 20 by interrogating the signal induced in the receivers C, D.

To survey specific formations ("targets") in the subsurface, the offsets required are between two and four times the target depth in the subsurface. Deep targets therefore require relatively long offsets, however the signal amplitude is very small as a result. It has proven difficult to obtain adequate signal-to-noise ratio at long offsets and considerable effort has been devoted to optimizing signal acquisition parameters to maximize the detected signal amplitude. See for example, International Patent Application Publication No. WO 2007/104949 A1. Other techniques known in the art relate to minimizing the noise in the detected signals. See International Patent Application Publication No. WO 2008/023174 A2.

It is desirable to have a method for electromagnetic surveying of deep targets that provides better signal amplitude.

SUMMARY OF THE INVENTION

A method for electromagnetic surveying subsurface formations according to one aspect of the invention includes inducing an electromagnetic field in the subsurface formations by passing electric current through a transmitter. Response of the subsurface formations to the induced electromagnetic field is detected at a first plurality of spaced apart positions disposed longitudinally within a bipole length of the transmitter. A direct induction response is removed from the detected response.

Other aspects and advantages of the invention will be apparent from the following description and the appended claims.

DETAILED DESCRIPTION

Generally, methods of electromagnetic surveying according to the invention include inducing an electromagnetic field in subsurface formations to be surveyed using a transmitter having a selected bipole or dipole length. Electromagnetic response of the formations is detected at a plurality of positions longitudinally within the bipole or dipole length of the transmitter. A direct induction signal resulting from the magnetic field induced by current flowing though the transmitter may be removed from the measured response.

Figure 1:
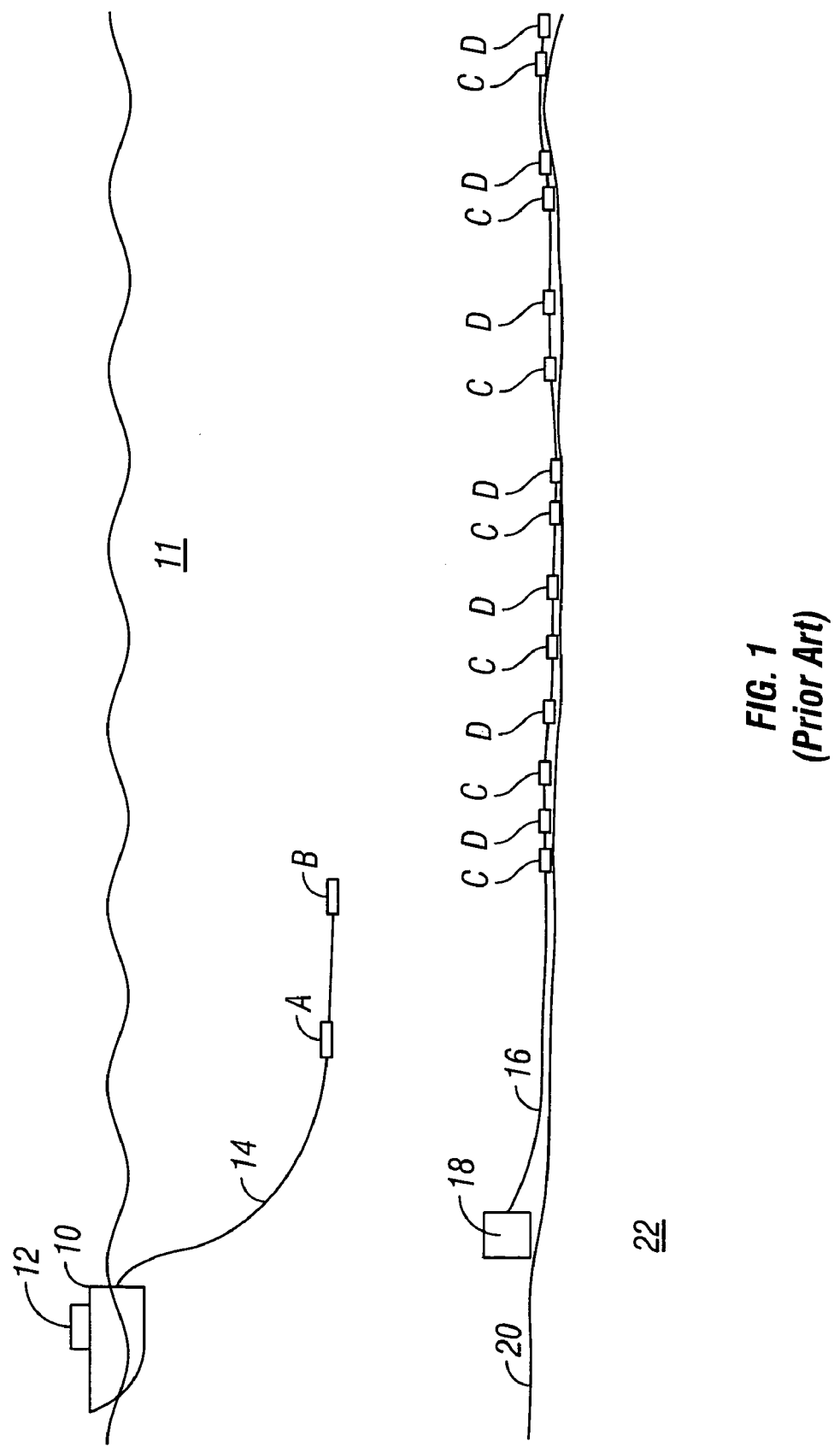
FIG. 1 shows a prior art example arrangement of an electromagnetic transmitter and electromagnetic receivers.
Figure 2:
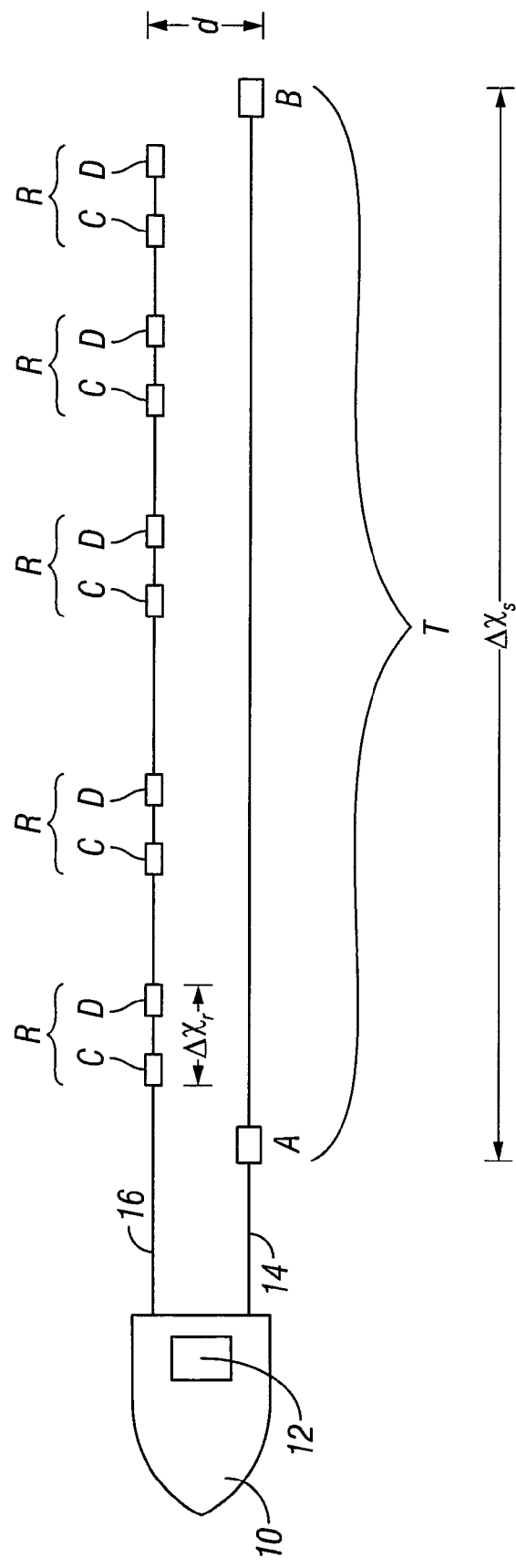
FIG. 2 shows an example arrangement of electromagnetic transmitters and receiver according to the invention.

An example transmitter and receiver configuration for acquiring electromagnetic signals according to the invention is shown in plan view FIG. 2. Elements of the acquisition system may be similar to those explained in the Background section with reference to FIG. 1, and in such cases will by described in the same terms in the present description. In the arrangement shown in FIG. 2, the electromagnetic transmitter T can be a grounded electric bipole having a selected length $\Delta x_s$ between transmitter electrodes A and B disposed on the source cable 14. The electromagnetic receivers R may be disposed in a line array of electric bipoles each consisting of a pair of electrodes C, D.

The electrodes C, D in each pair are shown as separated by a length $\Delta x_r$. The receivers R are disposed at spaced apart locations along the receiver cable 16, and all of the receivers R are shown longitudinally disposed between the transmitter electrodes A and B. The receiver cable 16 is typically offset a lateral distance d from the transmitter cable 14.

In the example shown in FIG. 2, the recording system 12 may include, in addition to the power supply to actuate the transmitter T, particular equipment (not shown separately) for interrogating the receivers R and making a time indexed record of the signals detected by each receiver R. The particular equipment used to actuate the transmitter T, to interrogate the receivers R and to make signal recordings will be familiar to those skilled in the art and will not be explained in any further detail herein for clarity of the description of the invention. Preferably the current passing through the transmitter to induce an electromagnetic field in the subsurface formations will include direct current having one or more switching events configured to induce a transient electromagnetic field in the subsurface formations. The switching event may be one or more of switching the current on, switching the current off, reversing the current polarity, a pseudorandom binary sequence (PBRS) and combinations thereof.

It should also be noted that the example described with reference to FIG. 2, in which the transmitter T and the receivers R are horizontal electric bipoles, is only one possible configuration of transmitters and receivers that can be used with the present invention. The transmitter T may also be a vertical electric bipole, or either a vertical or horizontal magnetic dipole (wire loop or coil). Corresponding structures may be used for any or all of the receivers R. More than one transmitter, having the same or different length $\Delta x_s$ may be used in other examples.

Because the receivers R are relatively close to the transmitter T, as contrasted with the arrangement shown in FIG. 1, the electromagnetic signal propagating back from the formations disposed below the transmitter T and the receivers R is relatively larger than for the configuration shown in FIG. 1. Typically the distance $\Delta x_s$ between electrodes A and B in the transmitter T will be on the order of five times the target depth.

However, because of the proximity of the transmitter T to the receivers, R, the receivers R will detect a substantial signal that propagates directly from the transmitter T. There are two components to such directly propagated signal. The first component is known as the "air wave", which is a signal that propagates through the air from the transmitter T to each of the receivers R at about the speed of light. The second component is an induced voltage proportional to the rate of change of the magnetic field caused by the current flowing in the transmitter cable 14; that is, the second signal component is proportional to the time derivative of the current flowing in the transmitter cable 14.

The voltage signal between any pair of receiver electrodes C and D can thus be expressed as:

$$v_{CD}(t) = \Delta x_r \Delta x_s i_{AB}(t) * g_{CD,AB}(t) + \frac{F}{r}\Delta x_r \frac{di(t)}{dt} + n(t), \quad (1)$$

in which i(t) is the transmitter current, the asterisk denotes convolution, $g_{CD,AB}(t)$ represents the total impulse response including the air wave, F is a geometrical factor approximately equal to unity, and n(t) is noise, including electrode noise and magnetotelluric noise. The remaining terms have already been defined herein. In equation (1) the Earth's response to the magnetic field from the transmitter cable 14 is neglected; it is believed to be negligible. i(t) is measured proximate the transmitter electrodes A, B. An inverse filter f(t) is determined such that:

$$i(t)*f(t)=\delta(t). \quad (2)$$

That is, convolution of the measured current with the filter yields a delta-function, that is, a spike at t=0. Applying the filter f(t) to the voltage measured across each of the pairs of receiver electrodes C, D yields the expression:

$$f(t) * v_{CD}(t) = \Delta x_r \Delta x_s \delta(t) * g_{CD,AB}(t) + \frac{F}{r}\Delta x_r \delta'(t) + f(t)*n(t) \quad (3)$$
$$= \Delta x_r \Delta x_s g_{CD,AB}(t) + \frac{F}{r}\Delta x_r \delta'(t) + f(t)*n(t),$$

in which $\delta'(t)$ is the time-derivative of a delta-function. The first term in equation (3) is the total impulse response, scaled by the respective transmitter and receiver bipole lengths, and with the air wave response at t=0. The second term in equation (3), $(F/r)\Delta(x)_r\delta'(t)$, is the time derivative of an impulse, and the third term, n(t), is the noise including magnetotelluric noise and electrode noise.

The air wave response can be substantially removed from the total measured response by setting the response equal to zero at t=0. It is then necessary to remove the second term in equation (3), which is the non-causal time-derivative of an impulse. Integrating both sides of equation (3) provides the expression $$\int f(t)*v_{CD}(t)dt = \quad (4)$$
$$\Delta x_r \Delta x_s \int g_{E,CD,AB}(t)dt + \frac{F}{r}\Delta x_r \delta(t) + \int f(t)*n(t)dt.$$

On the right-hand side of equation (4) the first term is the step response of the Earth without the air wave, scaled by the respective transmitter and receiver bipole lengths. The step response is the response to a step function change in current, that is, the response to switching the current from 0 to a non-zero value, and holding the current at that value. The step response is the integral of the impulse response. The step response is causal and is equal to zero at t=0. The second term is a spike at t=0, which can be removed by setting the value at t=0 to zero. The third term is the noise. After elimination of the second term, equation (4) becomes $$\int f(t)*v_{CD}(t)dt = \Delta x_r \Delta x_s \int g_{E,CD,AB}(t)dt + \int f(t)*n(t)dt \quad (5)$$

If the transmitter moment (the product of current and bipole length) is large enough, the signal-to-noise ratio in the receiver signals will be relatively large and the noise term can be effectively neglected. The late-time value of the step response is the DC value. Standard two dimensional DC resistivity inversion methods may be used to obtain a two dimensional model of subsurface resistivity, which can be used as a starting model for full waveform inversion. See, for example, Loke M. H., *Electrical imaging surveys for environmental and engineering studies*, which may be obtained at the Uniform Resource Locator (http://www.abem.com/ftp/Loke/2Dnotes.pdf). The two dimensional model may be used as a starting point for three dimensional inversion.

Figure 3:
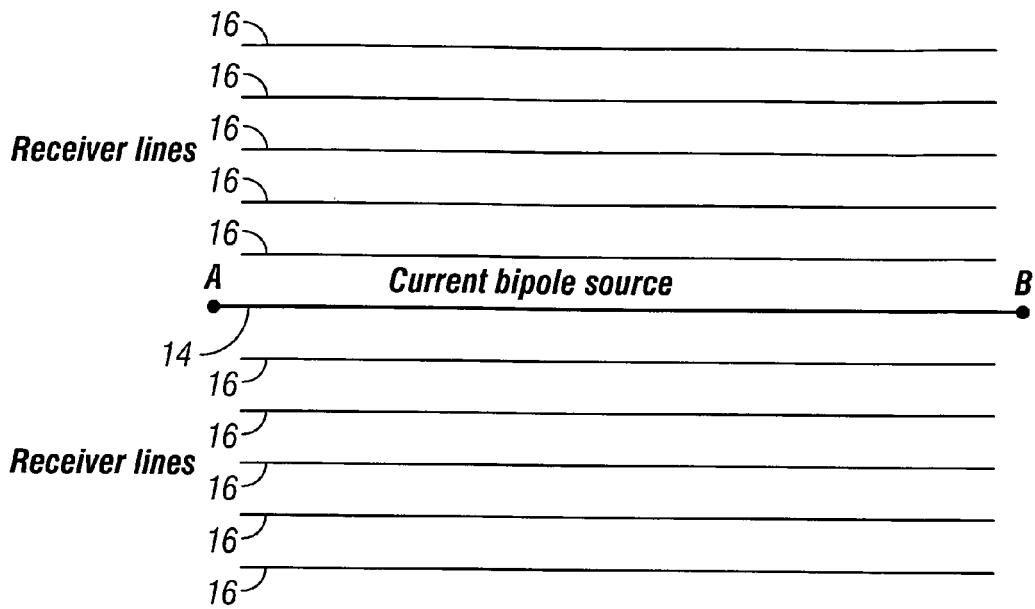
FIG. 3 shows an example of a two dimensional arrangement of electromagnetic transmitters and receivers that may be used on land to survey the three-dimensional volume beneath the array.
Figure 4:
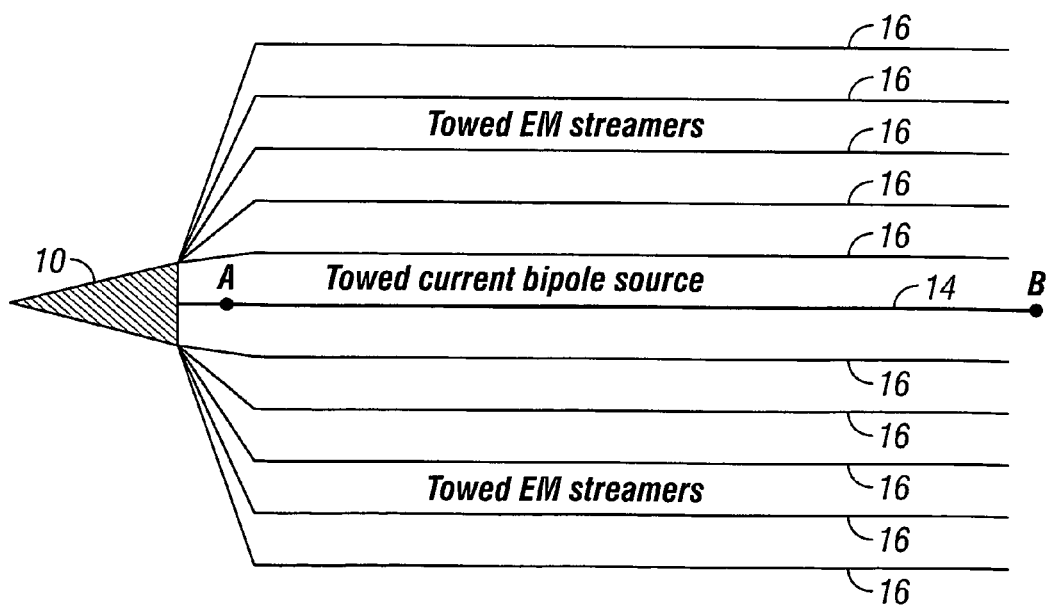
FIG. 4 shows an example of a two dimensional arrangement of electromagnetic transmitters and receivers that may be used in a body of water to survey the three-dimensional volume beneath the array.

The foregoing arrangement of electromagnetic transmitter and receivers may be extended to include a plurality of receiver cables substantially as shown in FIG. 2, wherein the receivers R are longitudinally disposed between the transmitter electrodes A, B. The receiver cables 16 may be laterally spaced apart. FIG. 3 shows one such example that may be used for land-based surveys. The transmitter cable 14 may be disposed in a central position in an array of receiver cables 16 disposed on both lateral sides of the transmitter cable 14. A corresponding arrangement for use in marine surveying is shown in FIG. 4, in which the transmitter cable 14 and the receiver cables 16 are towed by the survey vessel 10 in a manner similar to that used to tow marine seismic surveying systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for electromagnetic surveying subsurface formations, comprising:
    inducing an electromagnetic field in the subsurface formations by passing electric current through a transmitter, wherein the transmitter is deployed above an area of the subsurface to be surveyed and is disposed in a cable towed by a vessel;
    detecting response of the subsurface formations to the induced electromagnetic field at a first plurality of spaced apart positions disposed longitudinally entirely within a bipole length of the transmitter using receivers deployed in a plurality of cables laterally spaced apart from the transmitter cable and towed by the vessel, the receivers disposed entirely within the bipole length of the transmitter; and
    removing a response component resulting from energy propagating directly from the transmitter to each of the spaced apart positions from the detected response.

2. The method of claim 1 wherein the detecting response comprises measuring voltages impressed across spaced apart pairs of electrodes.

3. The method of claim 1 wherein the transmitter comprises a pair of spaced apart electrodes.

4. The method of claim 1 further comprising detecting response of the subsurface formations at a plurality of second spaced apart positions disposed longitudinally entirely within the bipole length of the transmitter and laterally spaced apart from the first positions.

5. The method of claim 1 wherein the detecting is performed by deploying a line of electromagnetic receivers above an area of the subsurface to be surveyed.

6. The method of claim 5 wherein the line of receivers is disposed in a cable towed by a vessel.

7. The method of claim 1 wherein the current includes at least one switching event.

8. The method of claim 7 wherein the at least one switching event comprises one of switching current on, switching current off, reversing current polarity, a pseudorandom binary sequence and combinations thereof.

9. The method of claim 1 wherein the bipole length of the transmitter is about five times a depth in the subsurface of a target formation.

* * * * *